United States Patent [19]

Smitley

[11] Patent Number: 4,549,665
[45] Date of Patent: Oct. 29, 1985

[54] SHELF ASSEMBLY

[75] Inventor: Bruce B. Smitley, North Canton, Ohio

[73] Assignee: Republic Steel Corporation, Cleveland, Ohio

[21] Appl. No.: 414,554

[22] Filed: Sep. 3, 1982

[51] Int. Cl.$^4$ .............................................. A47F 5/00
[52] U.S. Cl. .................................... 211/191; 108/111; 211/187; 403/253; 403/387
[58] Field of Search ............... 211/191, 187, 208, 182; 403/253, 316, 254, 271, 387; 108/111; 248/243

[56] References Cited

U.S. PATENT DOCUMENTS

| | | |
|---|---|---|
| 1,254,094 | 1/1918 | Vogt . |
| 1,288,010 | 12/1918 | Isaac . |
| 2,895,619 | 7/1959 | Frazier . |
| 2,918,176 | 12/1959 | Bell et al. . |
| 2,932,368 | 4/1960 | Schell . |
| 2,932,409 | 4/1960 | Wineman . |
| 2,948,409 | 8/1960 | Wroblewski et al. . |
| 2,984,363 | 7/1961 | Lang et al. . |
| 2,990,920 | 7/1961 | Hoffman . |
| 3,043,409 | 7/1962 | Kremer et al. . |
| 3,045,834 | 7/1962 | Seiz . |
| 3,055,462 | 9/1962 | Steele . |
| 3,070,237 | 12/1962 | Fullerton et al. . |
| 3,095,975 | 7/1963 | Cassel et al. . |
| 3,096,108 | 7/1963 | Baybarz . |
| 3,097,747 | 7/1963 | Selkregg et al. . |
| 3,106,297 | 10/1963 | Schroeder . |
| 3,144,944 | 8/1964 | McConnell . |
| 3,144,945 | 8/1964 | Seiz . |
| 3,152,620 | 10/1964 | Selkregg et al. . |
| 3,186,527 | 6/1965 | Konstant et al. . |
| 3,195,735 | 7/1965 | Jay . |
| 3,208,778 | 9/1965 | Gordon . |
| 3,240,352 | 3/1966 | Baker, Jr. . |
| 3,266,635 | 8/1966 | McConnell . |
| 3,273,720 | 9/1966 | Seiz . |
| 3,303,937 | 2/1967 | McConnell . |
| 3,330,229 | 7/1967 | Ferdinand et al. . |
| 3,337,062 | 8/1967 | Seiz . |
| 3,346,126 | 10/1967 | Bloom et al. . |
| 3,351,212 | 11/1967 | McConnell . |

(List continued on next page.)

FOREIGN PATENT DOCUMENTS

| | | |
|---|---|---|
| 1803107 | 10/1969 | Fed. Rep. of Germany . |
| 3002401 | 8/1980 | Fed. Rep. of Germany . |
| 1460886 | 10/1965 | France . |
| 2447164 | 8/1980 | France . |
| 285256 | 1/1965 | Netherlands . |
| 379078 | 8/1964 | Switzerland . |

Primary Examiner—Robert W. Gibson, Jr.
Attorney, Agent, or Firm—Watts, Hoffmann, Fisher & Heinke Co.

[57] ABSTRACT

A shelf assembly (10) including apparatus (20, 22) for interlocking upright and transverse members (12, 14, 80, 90) without the need for separate fasteners or supplemental cross-bracing to achieve structural rigidity. The interlocking apparatus includes connectors (20) formed near the ends of the transverse beams, each connector comprising a lug (40) spaced from a side panel (30) of the transverse member (14) by a keyed pedestal (42). The pedestal is defined by spaced lug supporting legs (44, 46), joined by a curved interconnecting wall (48). The uprights include pairs of apertures (22) each defined by an upper slot segment (50a) having a lug clearance notch (52) and a lower slot segment (50b) having a narrowing transverse dimension. The upright and transverse members are interlocked by inserting the connectors of a transverse beam into the upper slot segments (50a) and then moving the transverse beam downwardly so that the lug overlies a face (30b) of the upright and the keyed pedestal coengages the edges of the lower slot segment (50b) at three areas (62a, 62b, 62c) for a given length. The lug engagement prevents lateral separation of the upright and the transverse member whereas the pedestal/slot engagement inhibits relative rotation between the upright and transverse members. A "T" upright (80) and a tie bar (90) are also disclosed which enable side-by-side shelf units and spaced apart shelf units to be joined as well as supplemental supports (88) engageable with opposite transverse beams. In addition, the tie bars may provide support for an aisleway for multi-level shelf units.

38 Claims, 24 Drawing Figures

U.S. PATENT DOCUMENTS

| | | |
|---|---|---|
| 3,352,584 | 11/1967 | Engel . |
| 3,362,738 | 1/1968 | Dygert et al. . |
| 3,391,795 | 7/1968 | Finlayson . |
| 3,392,848 | 7/1968 | McConnell et al. . |
| 3,414,224 | 12/1968 | Robilliard et al. . |
| 3,422,962 | 1/1969 | Burns et al. . |
| 3,438,343 | 4/1969 | McConnell . |
| 3,456,970 | 7/1969 | Sunasky . |
| 3,463,325 | 8/1969 | Zagotta et al. . |
| 3,472,539 | 10/1969 | Fenwick . |
| 3,499,672 | 3/1970 | Sunasky . |
| 3,510,010 | 5/1970 | Gasner . |
| 3,512,653 | 5/1970 | Erismann . |
| 3,545,626 | 12/1970 | Seiz . |
| 3,565,264 | 2/1971 | Grieher . |
| 3,612,290 | 10/1971 | Evans . |
| 3,626,487 | 12/1971 | Seiz . |
| 3,631,821 | 1/1972 | Zachariou ............... 211/187 X |
| 3,647,080 | 3/1972 | Denny . |
| 3,648,426 | 3/1972 | Chaudhary . |
| 3,702,137 | 11/1972 | Evans . |
| 3,726,414 | 4/1973 | Konstant . |
| 3,741,405 | 6/1973 | McConnell et al. . |
| 3,846,944 | 11/1974 | Lambert . |
| 3,862,691 | 1/1975 | Mori et al. . |
| 3,905,212 | 9/1975 | McConnell . |
| 3,986,318 | 10/1976 | McConnell . |
| 4,078,664 | 3/1978 | McConnell ............... 211/187 |
| 4,106,630 | 8/1978 | Rosenband . |

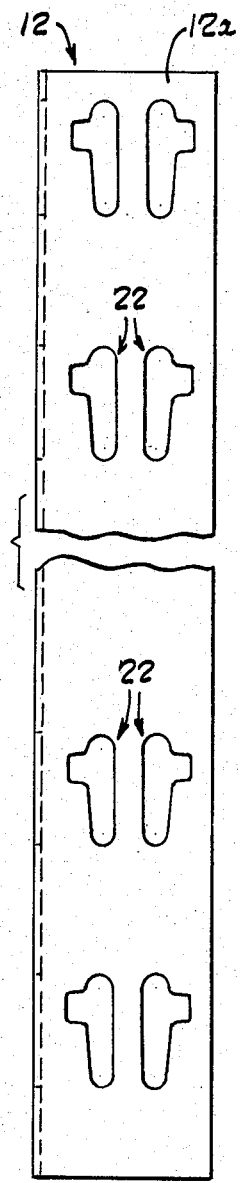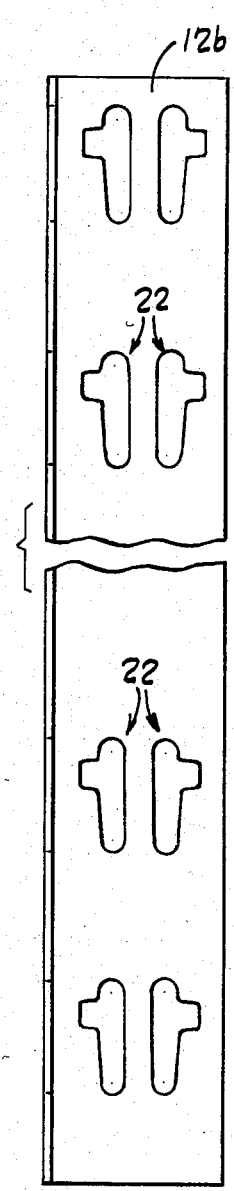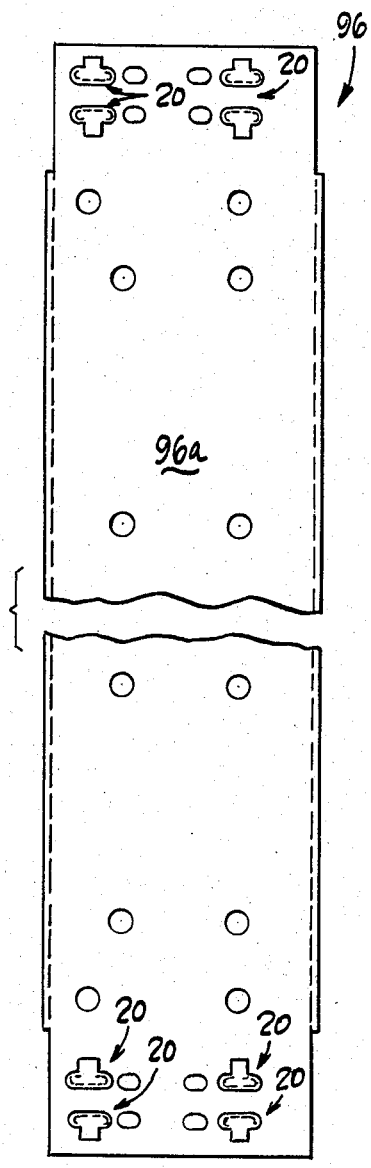
Fig. 8a  Fig. 8b  Fig. 17
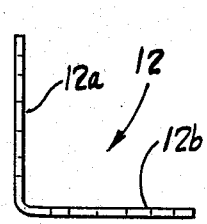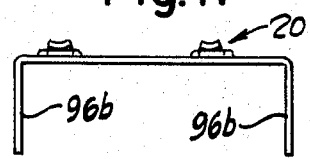
Fig. 9  Fig. 18

SHELF ASSEMBLY

DESCRIPTION

1. Technical Field

The present invention relates generally to storage shelves and in particular to an adjustable, an easily assembled, and self supporting shelf system.

2. Background Art

A variety of metal shelving units and/or storage racks are available today or have been suggested by the prior art. These units usually comprise at least four vertical members and a plurality of shelves that are attached to and extend between the vertical members. Alternately, some units are horizontal elements to tie uprights together which in turn support shelves or other components. In the past, in many if not most of these devices, the horizontal and vertical members would be secured together by one or more threaded fasteners. Generally, in the case of a shelf unit, the vertical members include a series of longitudinally spaced apertures and the shelves include companion apertures formed in the corners which in an assembled unit are aligned with the apertures in the vertical members. A threaded fastener extends through the aligned apertures to lock the shelves to the vertical support member. With this type of arrangement, assembly of the unit would usually be laborious and time consuming.

Shelving arrangements have also been suggested which reduce the need for separate threaded fasteners. Some of these prior suggestions included the use of rivets secured to the shelf which would extend through suitably formed apertures in vertical support members. With one proposal, the shelf unit would include a tab formed near a corner which would be engaged with an opening in the support members. In order to provide structural integrity, however, this latter proposal would also provide aligned pairs of apertures, one of which is formed in the shelf and the other of which is formed in a support. The aligned apertures are for receiving a threaded fastener to positively secure the shelf to the support. In many of these proposed shelving units, overall shelf stability would be achieved with separate bracing members that would extend diagonally across the sides and/or rear of the shelf unit. This cross bracing adds to the manufacturing cost and increases the overall assembly time for the shelf arrangement. In addition, it would seem that adjustment and/or removal of a shelf or transverse element would take considerable effort.

DISCLOSURE OF THE INVENTION

The present invention provides a new and improved shelf system in which vertical and transverse members are securely interlocked to each other and in which supplemental cross bracing is not required to provide the necessary shelf rigidity.

In the preferred and illustrated embodiment, the shelf assembly comprises vertical, load supporting upright members and transverse beam members interlocked to provide a self supporting, rigid structure. The rigid interlocking between an upright member and a beam member is achieved by connectors formed on one of the members which project through apertures formed in the other of the members and engage and interlock with other member walls adjacent the apertures. In the preferred embodiment, the connectors form part of the transverse beam members whereas the apertures are formed in the upright members.

In accordance with the preferred construction, at least one pair of connectors are formed near each end of a transverse beam. Each connector comprises an upright engaging lug spaced from the face of the beam by a keyed pedestal. The keyed pedestal is defined by an elongate projection having spaced end portions or lug support legs joined on one side by a curved interconnecting wall portion. The upright engaging lug extends laterally from the top of the projection to define a track between the lug and the face of the transverse beam between which a portion of the upright adjacent the aperture, is captured.

Each upright includes at least one pair of apertures, sized to receive and having surrounding walls which interlock with the connectors formed on the end of a beam. In the preferred configuration, a plurality of aperture pairs are spaced longitudinally along the upright so that multiple beam members can be engaged with the upright at various locations. Each aperture is defined by a substantially vertical, elongate slot having upper and lower slot segments. A clearance notch extends laterally from one side of the upper slot segment. The upper slot segment and clearance notch are sized to readily receive a connector, specifically allowing the lug to pass through the upright. The lower slot segment, preferably is sized to create an interference fit with the keyed pedestal. The interference fit is preferably achieved by gradually narrowing the transverse dimension of the lower slot segment.

With this preferred arrangement, a beam is releasably interlocked to an upright by inserting the connector pair through the upper slot segments of the desired aperture pair and then displacing the beam downwardly with respect to the upright so that the sides of the keyed pedestal engage the edges of the lower slot segment. When the connectors are seated in the associated slots, the lugs overlie face portions of the upright adjacent one side of the lower slot segments to prevent the beam and upright from operating. Unlike prior suggested constructions, the keyed pedestal not only provides a support for the upright engaging lug, it also coacts with the edges of the slot to prevent relative rotation between the upright and interlocked beam.

To provide an even more permanent coupling between an upright and transverse beam, holes are preferably formed in the beams above the connectors which become aligned with the upper slot segments when the beam is moved to the interlocked position. A fastener or clip can be placed in the aligned holes to secure the interlocking between the members.

In the preferred pedestal configuration, each lug support leg of the projection wall defines an area of contact with one side edge of the lower slot segment. The curved interconnecting wall forms a contact area with the other side edge of the slot segment. With this arrangement, three spaced areas of contact between the pedestal and the slot segment are defined. Preferably, the areas defined on the support legs and the area defined on the curved interconnecting wall are positioned on either side of an imaginary center line drawn through the vertical center of each pedestal.

The disclosed engagement provides a self supporting shelf assembly that does not require additional cross bracing to provide structural rigidity. The connector/aperture engagement between the vertical and transverse members inhibits both lateral and rotative movement between the members. In addition, although the projection/aperture engagement provides a rather rigid connection, the two members can still be easily disassembled for adjustment, shelf modification, shelf repositioning, etc.

In the preferred shelf assembly, at least four uprights, each defined by two planar sections joined together at substantially 90° to form an L-shaped configuration are used. Each planar section of each upright includes a plurality of paired apertures, spaced longitudinally along the longitudinal extent of the uprights. The projections formed on opposite ends of each transverse beam, are preferably integrally formed with the beam end by a suitable punching or drawing operation. In the preferred construction, the projections are merely struck near the ends of each beam as a step in the overall beam construction. The beam configuration lends itself to automated production methods and machines, reducing labor expense, while still providing a strong, easily assembled shelf unit that eliminates the need for separate fasteners or locking structure attached to one or more members in a separate manufacturing operation.

A "T" upright is also disclosed which provides a means for readily interlocking adjacent shelf units. The "T" upright comprises a pair of coplanar flat sections joined by a "U"-shaped extension oriented at 90° to the flat sections. The flat sections and extension each include a plurality of apertures engageable with transverse members of one or more shelf units. Supplemental support members are disclosed which can be easily engaged with opposite transverse beams to provide added support for shelves and components, and which can also serve as rack dividers.

A tie bar is disclosed which is used in connection with the "T" upright to interlock adjacent, but spaced apart shelf units. In addition the tie bar can serve as a foundation for a raised aisleway in a multi-story shelf assembly.

Additional features of the invention will become apparent and a fuller understanding obtained in reading the following detailed description made in connection with the accompanying drawings.

BRIEF DESCRIPTION OF THE DRAWINGS

FIGS. 8a, 8b are both side elevational views of a corner upright, forming part of the shelf assembly;

FIG. 9 is an end view of the upright shown in FIG. 8;

FIG. 17 is a side elevational view of a tie bar, constructed in accordance with the preferred embodiment;

FIG. 18 is an end view of the tie bar;

BEST MODE FOR CARRYING OUT THE INVENTION

Figure 1:
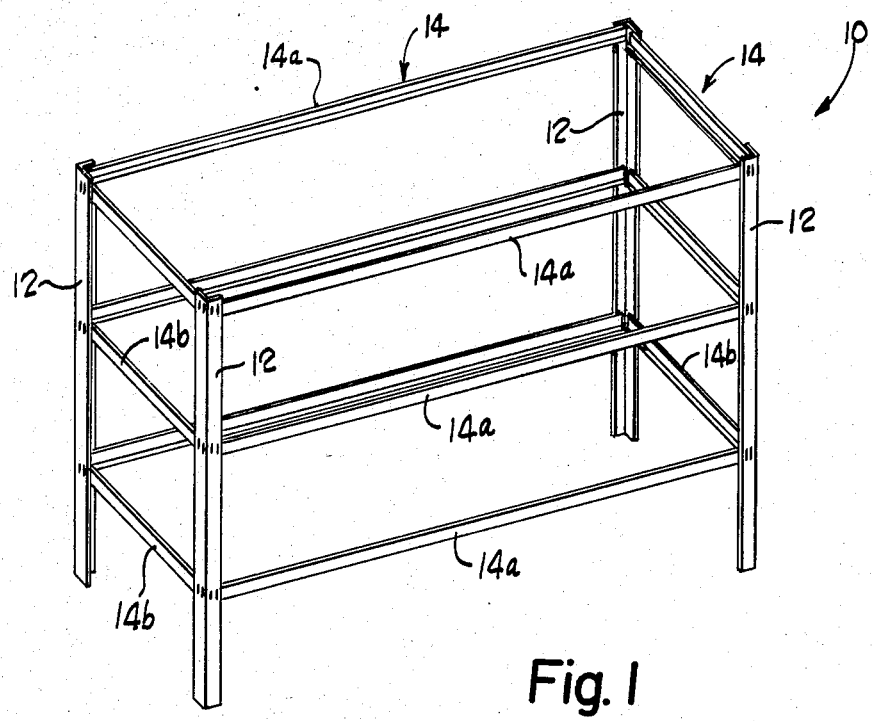
FIG. 1 is an isometric view of a shelf assembly constructed in accordance with the preferred embodiment of the invention.

FIG. 1 illustrates the overall view of a shelf assembly 10 embodying the present invention. The shelf assembly comprises four corner uprights 12, and a plurality of transverse beam members, indicated generally by the reference character 14, that extend between and interlock with adjacent corner uprights. For purposes of explanation, the longer transverse beam members extending across the front and back of the shelf unit 10 are designated by the reference character 14a, whereas the shorter transverse members extending front to back are designated by the reference character 14b. In the preferred embodiment, the interlocking members between the uprights 12 and the transverse members 14a, 14b are substantially identical.

Referring also to FIGS. 2–5, connectors 20, preferably formed near the ends of the transverse beams 14, releasably engage and interlock with apertures 22 formed in the corner uprights 12. Each transverse beam is of uniform cross-section longitudinally and includes a substantially flat side panel 30 and an integrally formed, rigidizing flange 32. The flange 32 includes a lateral extension 32a that joins the side panel 30, a support lip 32b that extends substantially parallel with the lateral extension 32a and an angled portion 32c that joins the support lip 32b to the extension 32a. When the transverse beam 14 is oriented in the position illustrated in FIG. 5, the lip 32b defines a support for a shelf 34 (indicated in phantom in FIG. 5) or other component. In use, four transverse members 14 (2 pairs of members 14a, 14b) mounted at the same level on the uprights 12 define a shelf support. The shelf is sized to fit within the perimeter defined by the transverse members and thus movement in the shelf is restricted by inside surfaces 30a of the side panels 30.

Figure 5:
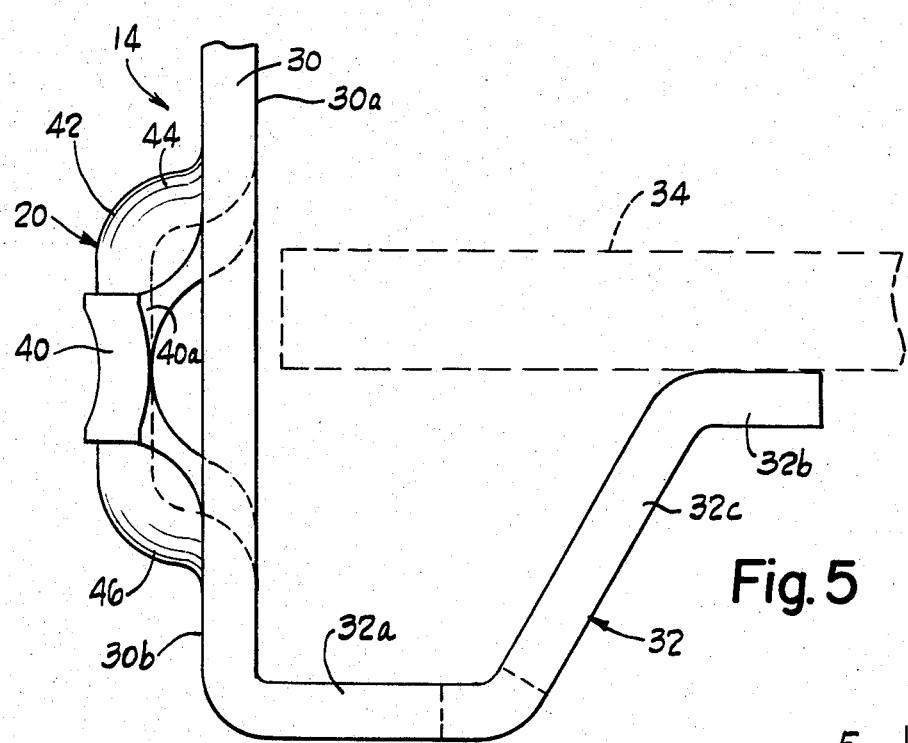
FIG. 5 is a sectional view, as seen from the plane indicated by the line 5—5 in FIG. 4.
Figure 4:
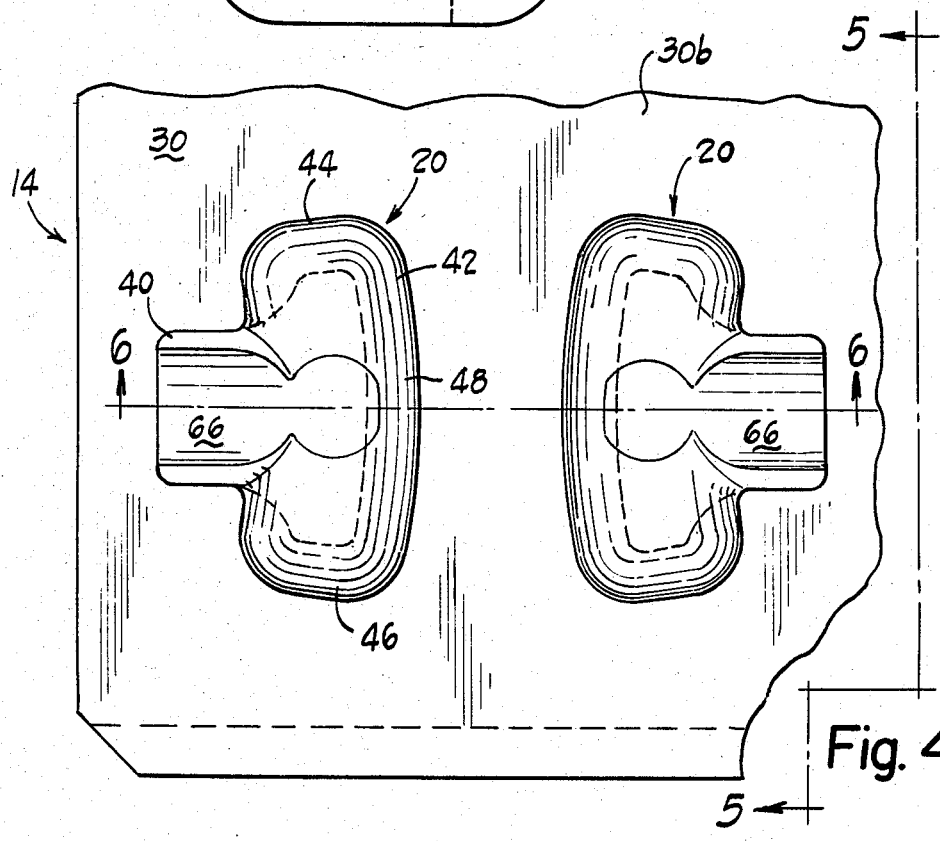
FIG. 4 is an elevational view of a pair of connectors forming part of the interlocking apparatus.
Figure 6:
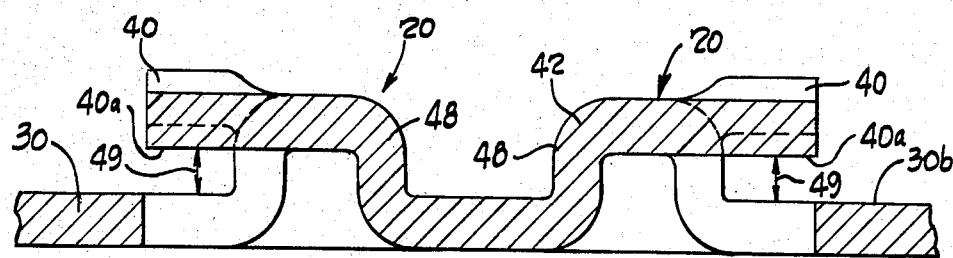
FIG. 6 is a sectional view of the connectors as seen from the plane indicated by the lines 6—6 in FIG. 4.

Turning in particular to FIGS. 4–6, the detailed construction of the connectors 20 in the transverse beams 14 are shown. The connectors 20 are preferably formed near the ends of each transverse beam. The connectors 20 each comprise a lug 40 spaced from an outside face 30b of the side panel 30 by a keyed pedestal 42. The pedestal 42 is formed by an elongate projection defined by spaced, upper and lower lug supporting legs 44, 46, joined on one side by a curved interconnecting wall 48. The lug 40 extends laterally from the pedestal in a direction substantially parallel with the plane of the outer face 30b of the side panel 30. With this arrangement, a track 49 is defined between the surface 30b and an undersurface 40a of the lug 40 for receiving a portion of the upright 12.

The lugs 40 and keyed pedestals 42 are preferably struck from the face panel 30 of the transverse beam 14, on one or more metal forming steps. In this way, the connectors 20 are integrally formed with the beam members and the entire construction of the beam can thus be accomplished on high speed automatic metal forming equipment such as roll formers.

Figure 7:
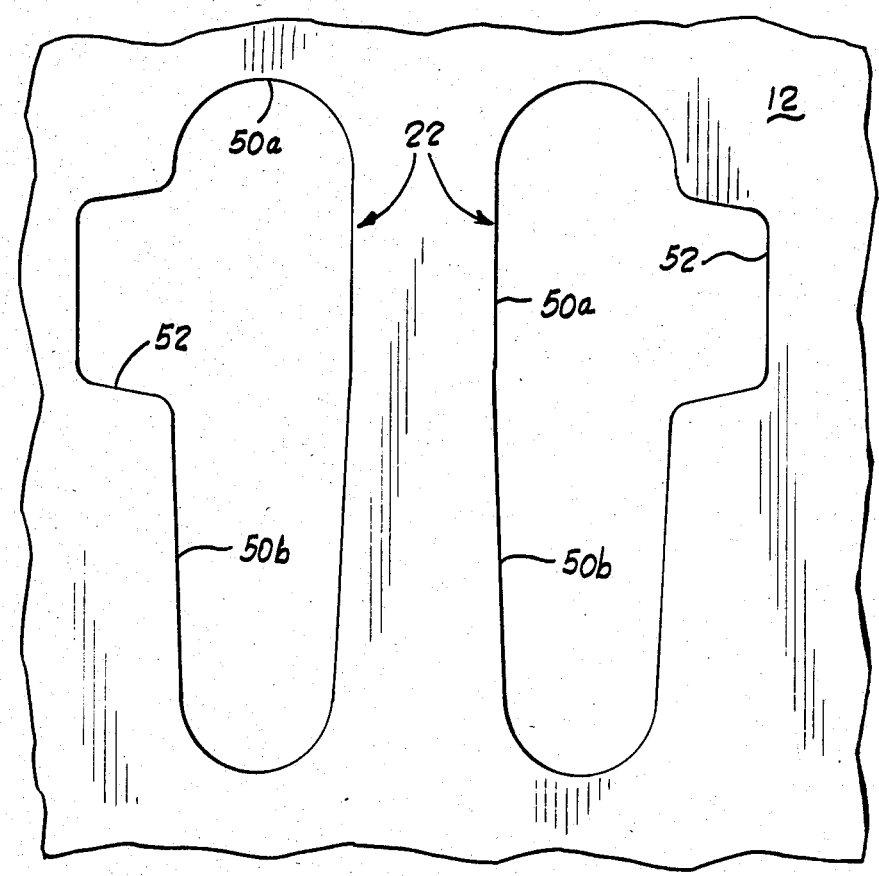
FIG. 7 is an enlarged, fragmentary view of a vertical shelf member, illustrating apertures constructed in accordance with the preferred embodiment.

Turning now to FIG. 7, the construction of the interlocking apertures 22 formed on the vertical uprights is shown in enlarged detail. The apertures 22 are constructed to easily receive and interlock with a pair of connectors 20 formed at the ends of a transverse beam. Each aperture 22 comprises an elongate slot having upper and lower slot segments 50a, 50b. A lug clearing notch 52 extends laterally from one side to each upper slot portion 50a. In the preferred embodiment, the transverse dimension of the lower slot segment 50b gradually narrows from top to bottom so that an interference fit is created when the connectors 20 are engaged.

Figure 2:
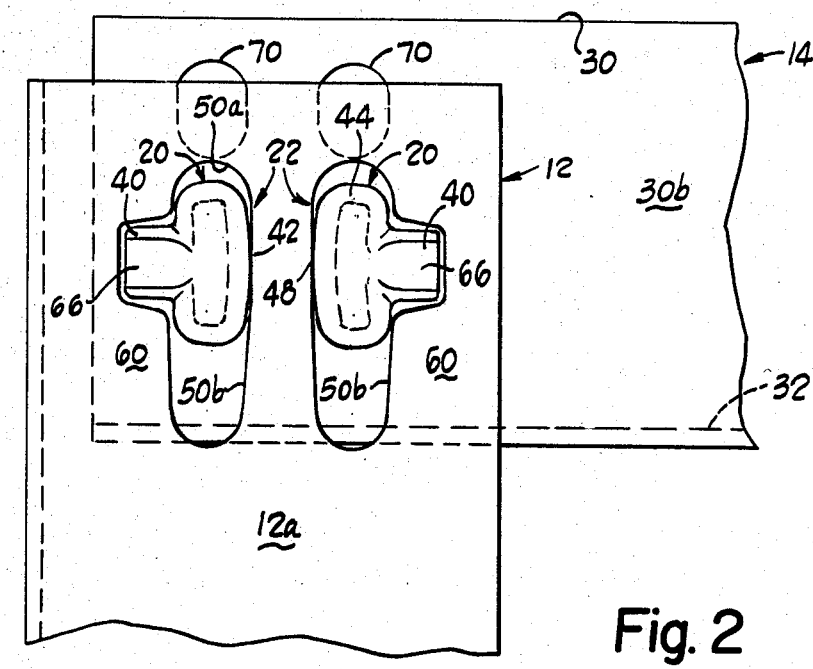
FIG. 2 is an elevational view of an apparatus for interlocking shelf members constructed in accordance with the preferred embodiment, shown in an initial, noninterlocked position.

Returning now to FIGS. 2 and 3, the connectors 20 formed at the end of the transverse beam 14 are interlocked with a pair of apertures 22 formed in an upright 12 by first positioning the upright 12 and the beam 14 as shown in FIG. 2 so that the connectors 20 pass through the upper slot segments 50a of the apertures 22. The transverse beam 14 is then moved downwardly (as viewed in FIG. 2) so that the connectors 20 move into the position shown in FIG. 3. In this position, a portion of the upright, indicated by the reference character 60 in FIG. 2, is captured between the undersurface of the lug 40 and the outside face 30b of the transverse beam. This lug/upright engagement, prevents the beam and upright from lateral separation.

Figure 3:
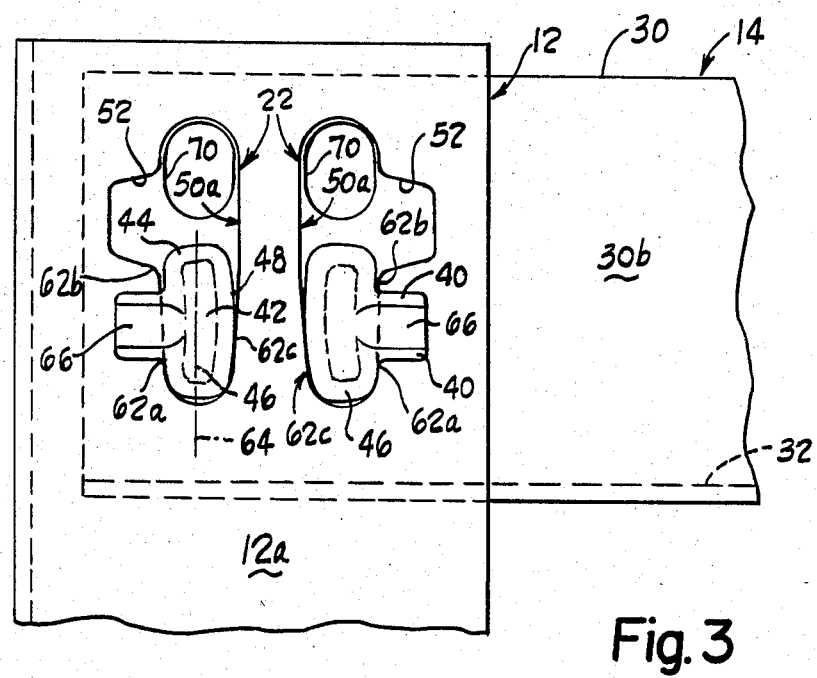
FIG. 3 is an elevational view of the interlocking apparatus, shown in an interlocked position.

Unlike some prior suggested connectors, the lug pedestals 42 are keyed to provide an interference fit with the lower slot segments 50b when the connectors 20 are bottomed (as shown in FIG. 3). The interference engagement between the pedestals and lower slot segments inhibits relative rotational movement between the uprights 12 and the transverse beam 14, thus providing an extremely rigid interlocking of the shelf members, eliminating the need for supplementary cross-bracing.

In the preferred construction, when the connectors 20 are fully seated in the lower slot segments 50b, at least three areas of contact between the pedestal 42 and the lower slot segment 50b occur. In particular, these areas of engagement are indicated by the reference characters 62a, 62b and 62c. The contact areas 62a, 62b are preferably effected between the lug-side of the lug support legs 44, 46 and one edge of the lower slot segment 50b. The contact 62c is effected between the interconnecting wall 48 and the opposite edge of the lower slot segment 50b. In short, this arrangement provides three spaced areas of contact with the areas 62a, 62b, and the area 62c disposed in either side of an imaginary vertical centerline 64 drawn through the connector. The engagement between the keyed pedestal 42 and the aperture 22 resists relative rotation between an upright and a transverse beam, thus creating a rather rigid interlocking.

In the preferred embodiment, the contact areas 62a and 62c define lines of contact between the edges of the lower slot segment 50b and the support leg 46 and the interconnecting wall 48, respectively. Consequently, a wedging engagement between the keyed pedestal 42 and the edges of the lower slot segment 50b is achieved when the connectors 20 are in the interlocked position shown in FIG. 3.

According to a feature of the invention each lug 40 includes a reinforcing rib 66 to add additional rigidity to the lug. In accordance with this feature, the rib imparts a slight radius to the lug 40, as seen in FIG. 5. The radius not only strengthens the lug 40 but the curved undersurface 40a facilitates the engagement between a transverse member 14 and the upright 12. In effect, the curved undersurface 40a provides a "lead" so that when the connectors are moved from the position shown in FIG. 2 to the position in FIG. 3, the rounded edge defined by the lower surface 40a of the lug 40 easily overlaps the outer face 30b of the upright to facilitate the movement of the beam 14 into its final interlocked position.

Returning to FIGS. 2 and 3, another feature of the invention is illustrated. The transverse beam may be formed with holes 70 located a spaced distance above the connectors 20 as seen in FIG. 2. When the beam 14 is moved into the interlocked position shown in FIG. 3, at least a portion of the holes 70 are aligned with respective upper slot segments 50a. A bolt or safety clip (not shown) can be inserted through the aligned opening to provide a rather permanent connection of the upright 12 and beam 14, if desired.

FIGS. 8a, 8b and 9 illustrate the construction of the corner uprights 12. In the preferred embodiment, each corner upright 12 comprises two adjacent flat sections 12a, 12b oriented at an angle of substantially 90° with respect to each other to define an L-shaped configuration. A plurality of pairs of the apertures 22 are spaced longitudinally along the entire length of each flat section 12a, 12b, enabling a plurality of transverse members 14a, 14b to be engaged at various locations to define plural shelf locations.

Figure 10:
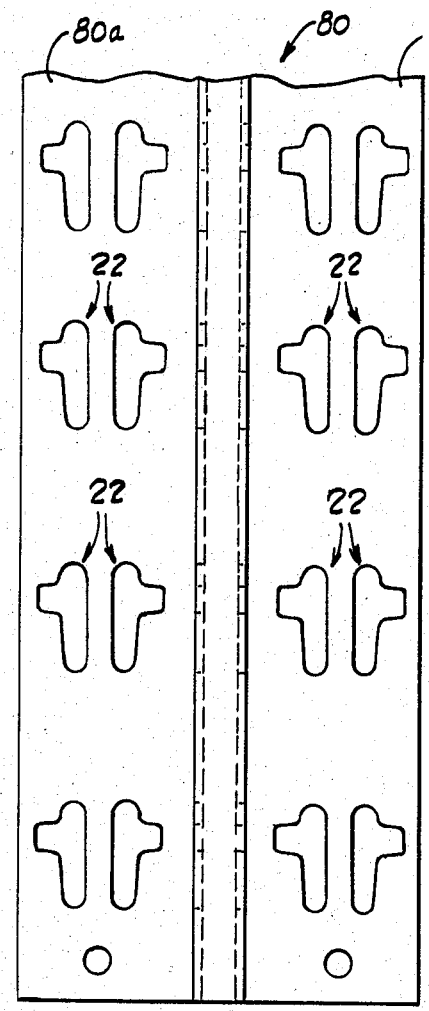
FIG. 10 is an elevational view of a "T" upright constructed in accordance with the preferred embodiment.
Figure 12:
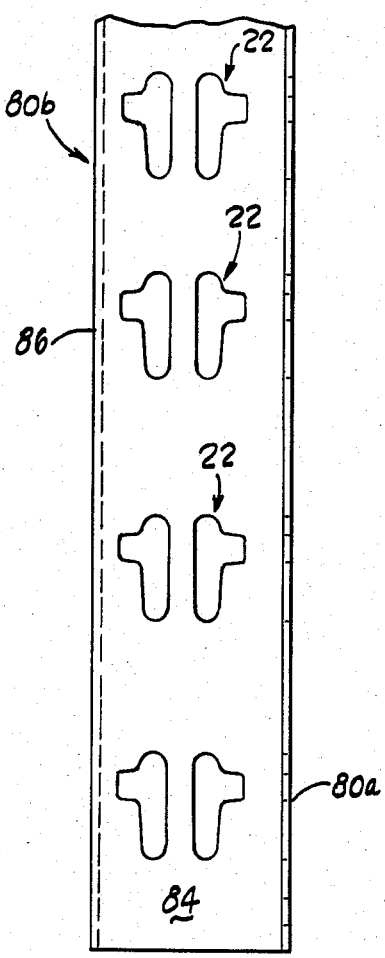
FIG. 12 is a side elevational view of the "T" upright.
Figure 11:
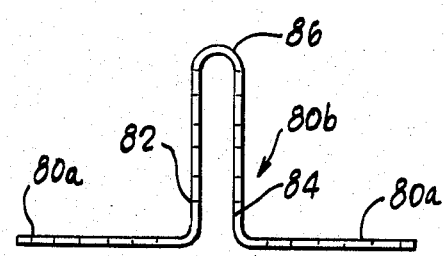
FIG. 11 is an end view of the "T" upright shown in FIG. 10.
Figure 13:
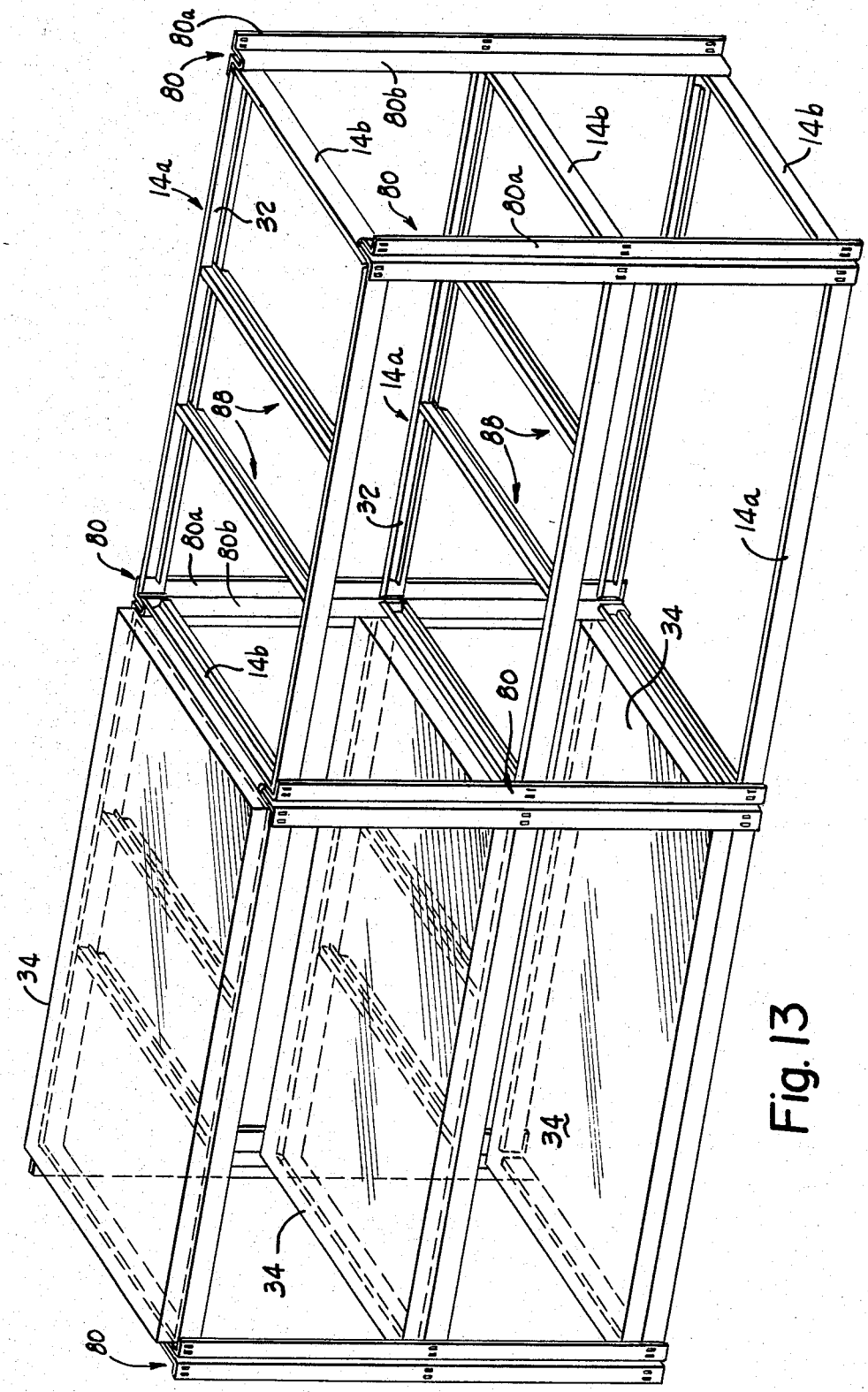
FIG. 13 is an isometric view of a shelf assembly embodying other features of the present invention.

FIGS. 10–12 illustrate the construction of a "T" upright 80 for joining adjacent shelf units which also embodies the present invention. FIG. 13 illustrates two interconnected shelf units utilizing the "T" uprights 80. As seen in the Figures, the "T" upright comprises two spaced, co-planar, flat sections 80a joined together by U-shaped extension 80b that comprises a pair of substantially parallel flat wall extensions 82, 84 interconnected by an arcuate wall 86. The wall extensions 82, 84 join the flat sections 80a at an angle of substantially 90°. Aligned pairs of apertures 22 are disposed longitudinally along the flat sections 80a and the wall extensions 82, 84.

To join multiple shelf units 10, at least two of the corner uprights 12 (shown in FIG. 1) are replaced with "T" uprights 80 as shown in FIG. 13. The front and back transverse members 14a of the adjacent shelf units interlock with the flat sections 80a whereas the front-to-back transverse beams 14b interlock with at least one of the wall extensions 82, 84. In many applications a single front-to-back transverse beam 14b extending between the U-shaped extensions 80b of the "T" uprights 80 will be sufficient at each shelf location. If added strength is desired, transverse beams 14b can be interlocked with both wall extensions 82, 84 as shown in FIG. 13.

FIG. 13 illustrates other important features of the invention. Due to the symmetrical configuration of the connectors, the transverse beams 14 are invertible and can be interlocked to the uprights 12, 80 with the rigidizing flange 32 at the top or bottom of the side panel 30.

In FIG. 13, the transverse beams 14a, 14b are positioned with their flanges 32 on top, that is, inverted from the position shown in FIGS. 2–5. The shelves 34 sit atop the flange extensions 32a (shown in the inverted position in FIG. 5) of the flanges 32 and are retained in position by the uprights.

The shelving assembly shown in FIG. 13 includes supplemental support members 88 that extend front-to-back, that is, parallel to the transverse beams 14b. The supports 88 engage and are supported by the transverse beams 14a. The supplemental supports 88 provide additional support for the shelves 34 and in addition can serve as dividers, as well as component and hanger supports for shelf applications such as racks for storing and supporting automobile/truck exhaust pipe inventories.

Figure 14:
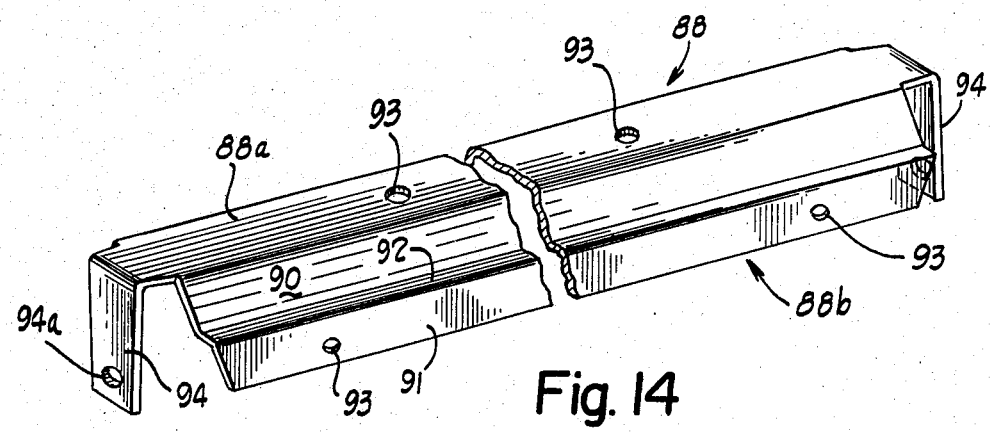
FIG. 14 is an isometric view of a supplemental support member constructed in accordance with the preferred embodiment of the invention.
Figure 15:
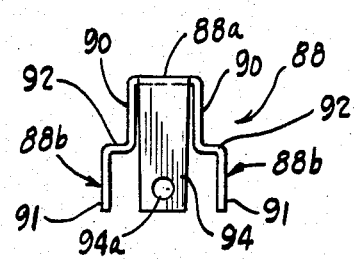
FIG. 15 is an end view of the supplemental support member.

Referring in particular to FIGS. 14 and 15, the supplemental supports 88 comprise elongate members having a channel-like construction. Each member 88 includes a flat planar section 88a which abuttably engages the underside of a shelf 34 when the member 88 is used as a shelf support. A pair of rigidizing flanges 88b depend downwardly from either side of the flat section 88a. Each flange 88b includes leg portions 90, 91 joined by a short transverse web 92. The size of the legs 91, 92 can be varied to suit particular strength requirements. The flat section 88a and flanges 88b include apertures 93 for receiving fasteners, hangers, etc.

Figure 16:
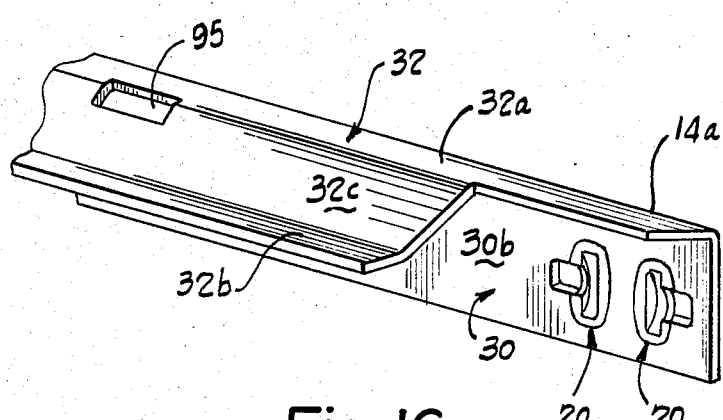
FIG. 16 is a fragmentary, isometric view of a transverse beam member.

A tab 94 depends downwardly at each end of the supplemental member 88 and preferably includes a small aperture 94a. Referring also to FIG. 16, the tabs 94 are engaged with slots 96 in opposite transverse members 14a formed at spaced locations in the flange 32 near the juncture of the flange extension 32a and the connecting web 32c. It should thus be appreciated that the supplemental members 88 are easily installed in a shelf unit, by merely inserting the tabs 94 into the slots 96 in opposite transverse beams. To maintain the engagement, the tabs 94 can be bent or alternately, fasteners such as screws or clips (not shown) can be placed in the tab apertures 94a.

The disclosed "T" upright 80 provides yet another feature of the present invention. In some applications, it is necessary to interlock adjacent, but spaced apart shelf units. In some prior suggested shelf arrangements, the spaced apart shelf units can only be joined with the use of special brackets or other components that are fastened to the respective shelf units by separate fasteners. With the present invention, spaced apart shelf units are connected using a tie bar 96 illustrated in FIG. 17 which includes connectors 20, substantially identical to those forming part of the transverse beams, which interlock with the apertures 22 in the "T" section. Referring also to FIG. 18, the tie bar 96 (which is shown standing on end in FIG. 17) includes a flat planar section 96a and a pair of 90° flanges 90b which serve to reinforce the tie bar. In the embodiment illustrated, two pairs of connectors 20 are formed at each end. Tie bars can also be fashioned with only one pair of connectors at each end and/or one or both flanges can be eliminated if the added rigidity provided by these elements is found to be unnecessary in a given application. In actual use, the tie bars 96 can serve not only as a means for "tying together" space shelf units but can serve as a support for a raised aisleway in multiple story shelf assemblies. For example, the corner and "T" uprights 12, 80 can be manufactured in lengths of 10 feet or longer to provide shelf units more than 15 feet tall (2 stories). With the present invention, tie bars 96 can be used to interconnect two spaced shelf units which in turn serve as a support for grating or flooring to define an aisleway space above ground level between the adjacent shelf units.

Figure 19:
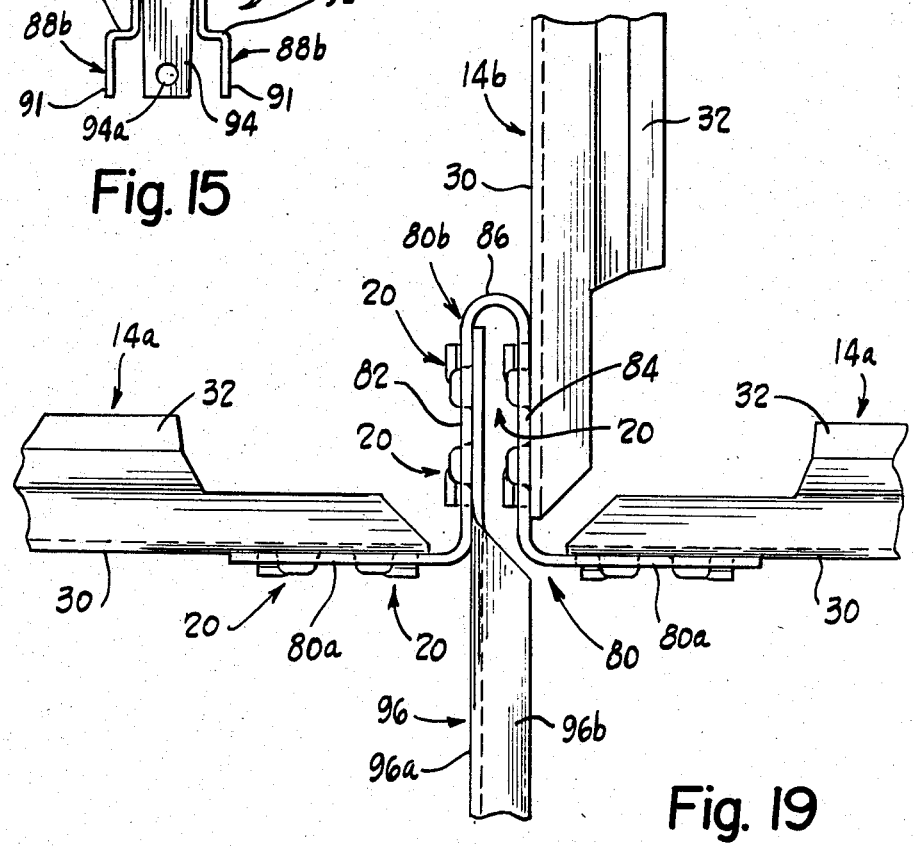
FIG. 19 is a top view illustrating a co-interlocking between transverse beam members, the "T" upright and the tie bar.
Figure 20A:
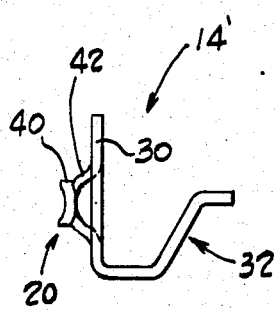
FIGS. 20a–d are sectional views of transverse beam members having different strengths.
Figure 20B:
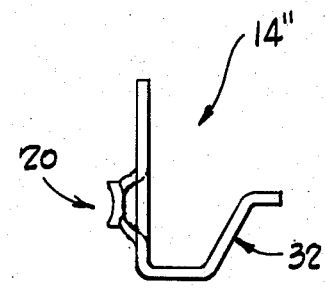
Figure 20C:
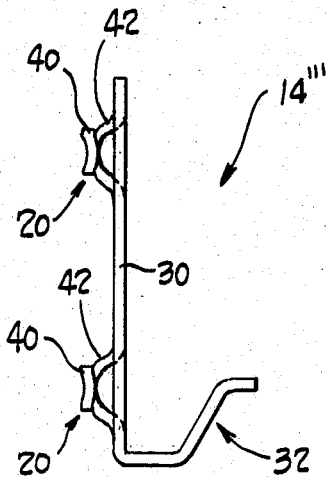
Figure 20D:
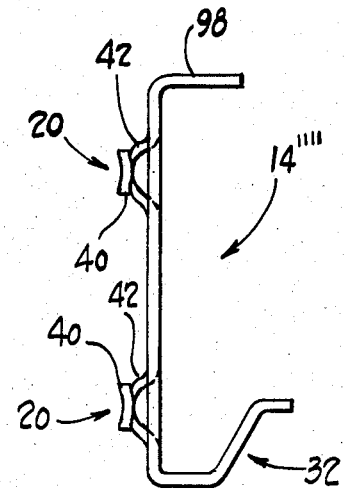

Referring now to FIG. 19, the multiple engagements possible between a "T" upright 80 and other transversely oriented members of the shelf unit is illustrated. In particular, each flat section 80a is interlocked with a transverse beam 14a. At least one leg of the U section is interlocked with a front-to-back transverse beam 14b. Finally, a tie bar 96 is inserted inside the U-shaped extension and interlocked with one of the extension walls 82, 84 forming the U-shaped extension. In actual use, the transverse beams 14a, 14b would be interlocked with apertures 22 all located at the same level of the "T" upright 80. In order to avoid interference between the transverse beams 14a, 14b and the tie bar 96 when a transverse beam 14b is coupled with each extension wall 82, 84 (only one transverse beam 14b is shown in the FIG. 19), the tie bar would preferably be interlocked with a set of apertures spaced above or below the apertures engaged by the transverse members.

The elements forming part of the disclosed shelf assembly and interlocking apparatus are easily modified to suit particular applications and to satisfy specific strength requirements. For example, the transverse member 14, illustrated in the Figures, includes a pair of symmetrical connectors 20 at each end which as indicated previously enables the beam 14 to be installed with the flange 32 either at the top or the bottom. If a stronger transverse member is desired, the side panel 30, or for that matter the flange 32 can be increased in size to provide the additional strength needed. In the preferred embodiment, additional strength in the transverse beam 14 is obtained by increasing the width of the side panel 30. In addition, two pairs of connectors 20 (like the arrangement illustrated for the tie bar 96 in FIG. 17) can be incorporated to provide a stronger interlocking engagement between an upright and a transverse member. Modifications can also be made to reduce material cost for shelves intended for very light applications. For example, the "T" upright 80 illustrated in FIGS. 10–12 is illustrated with an extension 80b comprising two wall extensions 82, 84, each formed with a plurality of pairs of apertures 22. In lighter applications, single apertures 22 spaced longitudinally along each wall extension 82, 84 can be utilized which engage transverse members having only a single connector 20, or alternately a vertically spaced pair of connectors 20 (not shown). In addition, the flanges shown for the various members can be reduced in size or even eliminated for light duty applications.

Each of the shelf elements, is configured to facilitate manufacture on high speed metal forming equipment such as rolling equipment. Consequently, the various members can be manufactured continuously and cut into any length desired so that relatively large shelf units can be assembled. In addition, the same tooling, with minimum modification or adjustment, can roll the shelf members for both light and heavy duty shelf units. For example, the same rolling equipment could form transverse members 14 having various side panel widths. In effect, the strength of a transverse member would be determined by the initial width of the sheet stock fed to the rolling equipment. The wider the initial stock, the wider the side panel 30 and hence the stronger the finished transverse member.

The details of this aspect of the invention are depicted in FIGS. 20a-d which illustrates a range of transverse beams 14 denoted for purposes of explanation as 14', 14", 14'" and 14"". As seen in the Figures, additional strength is obtained by increasing the width of the side panel 30 and the addition of another rigidizing flange 98 (not shown in FIG. 20d as part of beam 14""). In this preferred embodiment of adding strength to the transverse beam 14, the flange 32 remains unchanged, so that all four illustrated beams can be formed on the same rolling equipment with minimal change. The width of the initial stock dictates the strength of the resulting beam.

As seen in FIGS. 20a-d, additional connectors 20 are formed at the beam ends in the higher strength beams 14'", 14"". The connectors 20 are formed symmetrically so that the beams 14 shown in these two Figures can also be installed in the inverted position.

With the disclosed interlocking apparatus, shelf units can be quickly assembled without the need for separate fasteners. The interlocking provides an extremely rigid structure without the need for separate cross bracing, but yet is easily disassembled if shelf repositioning, removal, etc. is needed. The location of the shelves (or transverse member 14) is fully adjustable by virtue of the plurality of apertures 22 formed along the length of the uprights.

Although the invention has been described with a certain degree of particularity, it should be understood by those skilled in the art that various changes can be made to it without departing from the spirit or scope of the invention as hereinafter claimed.

I claim:

1. A storage assembly, comprising:
   (a) at least one load supporting upright;
   (b) at least one transverse element having an end portion coupled to said upright;
   (c) the end portion including a formed pair of spaced projections;
   (d) said upright including at least one pair of laterally spaced apertures for receiving and interlocking with said projections, each aperture being defined by a vertical, elongate portion and a transversely extending notch, extending from said elongate portion;
   (e) each projecton being defined by a support wall extending from a face of said beam end and supporting a projection surface spaced from said beam face, said projection surface including a laterally projecting lug, spaced above the face of said beam and shaped to fit through the notch in an associated aperture formed in said upright;
   (f) said projection support wall defining at least three spaced locations for engaging the elongate portion of said aperture, when said projection is seated such that the engagement between said support wall and said elongate portion substantially prevents relative rotation between said projection and said upright and said lug overlies a portion of a face of said upright to secure said beam to said upright to restrict movement in a direction orthogonal to the face of said beam end.

2. A storage assembly, comprising:
   (a) a plurality of vertically standing, corner uprights;
   (b) transverse beams extending between adjacent uprights;
   (c) means for releasably interlocking spaced parts of said beam to respective uprights, comprising:
   (i) a pair of laterally spaced projections integrally formed at the ends of each beam, each projection being defined by a raised surface spaced from a face of said beam end by an arcuate wall, said raised surface supporting a laterally extending lug;
   (ii) a pair of companion holes formed in each upright for receiving the paired projections, each hole being defined by a vertical elongate slot portion and a lateral notch portion extending from the vertical portion, said lateral notch portion being shaped to allow passage of said lug;
   (d) said arcuate wall including spaced areas engageable with said elongate portion for preventing relative rotation between said projection and said upright; and
   (e) said lug overlying a surface on said upright adjacent said elongate slot portion, when said projection is seated in said slot portion.

3. A storage assembly, comprising:
   (a) a support member;
   (b) a transverse member interlocked with said support member, said interlocking preventing relative rotation between said support and transverse members;
   (c) one of said members including a pair of laterally spaced projections;
   (d) the other of said members including a pair of projection receiving apertures, said apertures being defined by an elongate slot portion and a laterally extending notch portion;
   (e) each projection being defined by a wall extending from a surface of said one member and a projection surface spaced from said member surface including a laterally extending lug;
   (f) said projection wall including a plurality of spaced slot engaging locations for providing a rigid, non-rotational engagement between said projection and said slot portion and said lug overlying a surface adjoining said slot portion substantially to prevent relative lateral movement between said members.

4. A storage assembly, comprising:
   (a) four corner uprights, each upright including two elongate planar sections joined together at substantially 90° to form an L-shaped configuration;
   (b) transverse beams extending between adjacent planar sections of said corner uprights;
   (c) means for rigidly interlocking said beams and said uprights, comprising:
   (i) a pair of laterally spaced projections disposed near each end of each beam;
   (ii) each projection being defined by a projecting surface spaced from the upright abutting surface by a wall, said projection surface including a laterally extending lug having a curved, upright engaging surface;
   (i) the planar sections of each upright defining a plurality of paired projection receiving apertures, spaced longitudinally along each planar section;
   (iv) each aperture including a downwardly depending slot portion and a lug clearing portion extending laterally from the slot portion, a section of said slot portion below said lug clearing portion having a gradually decreasing transverse dimension;
   (v) said projections each being sized to pass through the upper portion of a corresponding aperture formed in said upright and further sized to rigidly engage the edges of the corresponding slot portion when said projection is seated to inhibit relative rotative motion between said beam and said upright, said lug overlying an upright surface adjacent said slot portion to prevent lateral motion between said upright and said beam.

5. In a storage assembly having at least four corner uprights each including planar sections joined at substantially 90° to form an L-shaped configuration, and beams extending between adjacent planar sections, a means for interlocking said beams to said uprights, comprising:

(a) a pair of projections formed near each end of each beam, each projection being defined by a surface spaced from an upright engaging surface near the end of said beam by a wall having upper and lower arcuate portions and a curved interconnecting portion joining one side of the arcuate portions, and a lug extending laterally from said projection surface, said lug defining an upright engagement surface spaced from the upright engaging surface formed on said beam;

(b) the planar sections of each upright including at least one pair of projection receiving apertures each having a projection clearing portion and a projection locking portion, each of said projection clearing portions being shaped to loosely receive a corresponding one of said projections and each of said locking portions including a narrowing transverse dimension such that when said corresponding projection is seated in its locking portion, an area on said curved interconnecting wall portion, and areas on said upper and lower arcuate wall portions concurrently engage edges on said locking portion substantially to prevent rotative movement between said upright and said beam and said tab abuttably engages a corresponding upright surface located adjacent said locking aperture portion.

6. A storage system, comprising:
(a) at least one storage assembly, said assembly comprising:
(i) at least four spaced apart, upright members;
(ii) a plurality of transverse beam members extending between and interlocked with said upright members;
(iii) said upright and transverse members being interlocked together by a pair of connectors formed in one of said members which extend through a pair of apertures formed in the other of said members and engage surfaces of the other member;
(iv) said connectors, each comprising a keyed pedestal that supports a lateral lug spaced from
(a) face of said one member;
(b) said apertures each being defined by an elongate slot having upper and lower slot segments and a lug clearing notch extending laterally from said upper slot segments;
(c) said lower slot segment of said aperture defining edges that provide a wedging, interference fit with an associated connector, when said connector is received by said lower slot segment, whereby rotation of said connector in said lower slot segment is substantially resisted.

7. The storage system of claim 6 wherein said connectors are formed near the ends of each transverse member and said apertures are formed in said upright members.

8. The storage system of claim 7 wherein a plurality of longitudinally spaced, pairs of apertures are formed in said upright members.

9. The storage system of claim 6 wherein said transverse members comprise transverse beams defined by a side panel and a rigidizing flange formed along one longitudinal edge of said side panel.

10. The storage system of claim 9 wherein said connectors are formed near the ends of each transverse beam and are arranged such that said transverse beam can be interlocked to said uprights in either of two positions, one position having the rigidizing flange at the top of said side panel and the other of said positions having the rigidizing flange of the bottom of said side panel.

11. The storage system of claim 6 wherein each transverse beam member includes two vertically spaced pairs of connectors near each end.

12. The storage system of claim 6 further including another assembly interlocked to said one assembly by means of a T-upright comprising two coplanar, flat sections joined together by a U-shaped extension, said flat sections and U section including apertures engageable with connectors formed near the ends of said transverse beam members.

13. The storage system of claim 12 wherein said extension of said T-upright is defined by a pair of spaced apart legs joined together by a curved interconnecting wall.

14. The storage system of claim 13 further including a tie bar for interlocking two adjacent, spaced apart shelf units.

15. The storage system of claim 14 wherein said tie bar is engageable with at least one leg of said T-upright extension.

16. The storage system of claim 6 further including supplemental support members.

17. The storage system of claim 16 in which said supplemental support members include means for engaging said transverse beam members.

18. The storage system of claim 17 wherein said transverse beam members each include at least one slot formed near a beam edge portion, each such slot being adapted for receiving a tab forming part of one of said supplemental support members.

19. The storage system of claim 7 wherein the transverse beam members each include at least one supplemental aperture formed in predetermined alignment with at least one of said connectors such that when one of said transverse beam members is in its interlocked position with one of said uprights, said supplemental aperture is substantially aligned with at least a portion of a corresponding one of said upper slot segments.

20. The storage system of claim 9 wherein said transverse beams are strengthened by a second rigidizing flange formed along another longitudinal edge of said side panel.

21. The storage system of claim 6 wherein said upright and transverse members are configured to facilitate manufacture on a continuous roll forming equipment.

22. A storage system, comprising:
(a) a plurality of load supporting, spaced apart upright members;

(b) a plurality of transverse members extending between and interconnecting said upright members to form a self standing, rigid structure;
(c) said upright and transverse members including means for releasably interlocking said members;
(d) each of said interlocking means comprising at least one pair of connectors formed on one member and a pair of companion apertures formed on the other of said members;
(e) each connector comprising:
  (i) a keyed pedestal supporting a lug spaced above a surface of said one member;
  (ii) said keyed pedestal being defined by an elongate projection extending from said surface;
  (iii) said projection including spaced apart lug supporting legs joined on one side by a curved interconnecting wall;
(f) each aperture formed in said other member including an elongate slot having upper and lower slot segments and a lug clearing notch extending laterally from said upper slot segment;
(g) said spaced apart legs and interconnecting wall defining areas of contact between said projection and slot surfaces defining said lower slot segments such that at least portions of said projection wedgedly engage said slot surfaces.

23. The storage system of claim 22 wherein said connectors are formed near the ends of said transverse beam members and said apertures are formed in said upright members.

24. The storage system of claim 22 wherein said certain of said upright members are L-shaped in cross-section and other of said upright members are T-shaped in cross-section, said L-shaped upright members defining corners of said shelf assembly and said T-shaped upright members defining junctures of adjacent storage units.

25. The storage system of claim 23 wherein said T-shaped upright members each include two coplanar sections joined together by a U-shaped extension having a pair of spaced apart legs joined by an arcuate wall, said coplanar sections having apertures engageable with connectors on said transverse members and said U-shaped extension including means for engaging said transverse members and concurrently engaging tie bars for interlocking adjacent, spaced apart shelf units.

26. The storage system of claim 22 wherein said transverse members include means for engaging supplemental support members.

27. The storage system of claim 22 wherein said transverse members are formed such that each transverse member may be mounted between adjacent uprights in at least either of two positions.

28. The storage system of claim 22 wherein said connectors each include a rigidizing rib.

29. The storage system of claim 22 wherein said transverse members each comprise a transverse beam defined by a side panel having a flange formed along one longitudinal edge.

30. The storage system of claim 29 wherein each transverse beam includes a rigidizing flange formed along another longitudinal edge of said side panel.

31. The storage system of claim 23 wherein each of at least some of the transverse members includes two vertically spaced pairs of connectors near each end.

32. The storage system of claim 23 wherein respective lugs of a pair of connectors extend laterally in opposite directions from each other.

33. In a multiple component assembly the improvement comprising:
(a) pair of interconnected members;
(b) one of the members including a first projection including a pedestal and a projecting lug;
(c) the other of the members including a first aperture having first and second sections;
  (i) the first section including openings sized to permit the first projection to pass through it so that abuttable faces of the members may be brought into juxtaposed relationship and the first lug may be positioned such that it can overlie an opposed surface of the other member;
  (ii) the second section being in communication with the first section and having walls adapted to provide a wedging, interference fit with the first pedestal as the first pedestal is moved into the second section said pedestal contacting said walls at spaced contact points whereby rotation of said pedestal in said second section is substantially resisted;
(d) the first lug being spaced from the one member abuttable face by a distance slightly less than the thickness of the other member such that as the first pedestal is moved into the second section the first lug will force the abuttable faces together as an interference fit is established between the first lug and the other member opposed surface;
(e) a first of the members including a second projection including a pedestal and a lug, the second projection being spaced from a selected one of the first projection and first aperture formed in the first member;
(f) a second of the members including a second aperture spaced from a selected one of the first projection and the first aperture formed in the second member;
(g) the second aperture having first and second sections;
  (i) the first section including openings sized to permit the second projection to pass through it so that abuttable faces of the members may be brought into juxtaposed relationship and the second lug may be positioned such that it can overlie an opposed surface of the second member;
  (ii) the second section being in communication with the first section and having walls adapted to provide an interference fit with the second pedestal as the second pedestal is moved into the second section; and,
(h) the second lug being spaced from the first member abuttable face by a distance slightly less than the thickness of the second member such that as the second pedestal is moved into the second section of the second section the second lug will force the abuttable faces together as an interference fit is established between the second lug and the second member opposed surface.

34. The assembly of claim 33 wherein the other member and the first member are the same member.

35. A storage assembly comprising:
(a) a plurality of uprights;
(b) at least one transverse element extending between the uprights and being connected to at least one of the uprights;
(c) the transverse element and said at least one upright being a pair of interconnected members;

(d) one of the members including a first projection including a pedestal and a projecting lug;

(e) the other of the members including a first aperture having first and second sections;

(i) the first section including openings sized to permit the first projection to pass through it so that abuttable faces of the members may be brought into juxtaposed relationship and the first lug may be positioned such that it can overlie an opposed surface of the other member;

(ii) the second section being in communication with the first section and having walls adapted to provide a wedging, interference fit with the first pedestal as the first pedestal is moved into the second section said pedestal contacting said walls at, at least, three spaced contact points whereby rotation of said pedestal in said second section is substantially resisted;

(f) the first lug being spaced from the one member abuttable face by a distance slightly less than the thickness of the other member such that as the first pedestal is moved into the second section the first lug will force the abuttable faces together as an interference fit is established between the first lug and the other member opposed surface;

(g) a first of the members including a second projection including a pedestal and a lug, the second projection being spaced from a selected one of the first projection and first aperture formed in the first member;

(h) a second of the members including a second aperture spaced from a selected one of the first projection and the first aperture formed in the second member;

(i) the second aperture having first and second sections;

(ii) the first section including openings sized to permit the second projection to pass through it so that abuttable faces of the members may be brought into juxtaposed relationship and the second lug may be positioned such that it can overlie an opposed surface of the second member;

(ii) the second section being in communication with the first section and having walls adapted to provide an interference fit with the second pedestal as the second pedestal is moved into the second section; and, (j) the second lug being spaced from the first member abuttable face by a distance slightly less than the thickness of the second member such that as the second pedestal is moved into the second section of the second section the second lug will force the abuttable faces together as an interference fit is established between the second lug and the second member opposed surface.

36. The assembly of claim 35 wherein the other member and the first member are the same member.

37. A storage system, comprising:
(a) one storage assembly comprising:
  (i) at least four spaced apart, upright members;
  (ii) a plurality of transverse beam members extending between and interlocked with said upright members;
  (iii) said upright and transverse members being interlocked together by a pair of connectors formed in one of said members which extend through a pair of apertures formed in the other of said members and engage surfaces of the other member;
  (iv) said connectors, each comprising a keyed pedestal that supports a lateral lug spaced from a face of said one member;
(b) said apertures each being defined by an elongate slot having upper and lower slot segments and a lug clearing said upper slot segments;
(c) another storage assembly interlocked to said one assembly by means of a T-upright comprising two coplanar, flat sections joined together by a U-shaped extension, said flat sections and U-section including apertures engageable with connectors formed near the ends of said transverse beam members.

38. A storage system comprising:
(a) at least one storage assembly, said assembly comprising:
  (i) at least four spaced apart, upright members;
  (ii) a plurality of transverse beam members extending between and interlocked with said upright members;
  (iii) said upright and transverse members being interlocked together by connectors formed in the transverse members which extend through associated apertures formed in the upright members and engage surfaces of the upright member, each transverse beam member including two vertically spaced pairs of connectors near each end;
  (iv) said connectors, each comprising a T-pedestal that supports a lateral lug spaced from a face of said transverse member;
(b) said apertures each being defined by an elongate slot having upper and lower slot segments and a lug clearing notch extending laterally from said upper slot segments.

* * * * *